(No Model.)

B. W. KYLE.
ROTARY PLOW

No. 563,973.   Patented July 14, 1896.

WITNESSES:
H. Rosmann
H. Wilson.

INVENTOR:
Barton W. Kyle

BY ℐ. W. Snes.

ATTORNEYS.

UNITED STATES PATENT OFFICE.

BARTON W. KYLE, OF ARLINGTON, NEBRASKA.

ROTARY PLOW.

SPECIFICATION forming part of Letters Patent No. 563,973, dated July 14, 1896.

Application filed August 28, 1893. Renewed December 26, 1895. Serial No. 573,347. (No model.)

*To all whom it may concern:*

Be it known that I, BARTON W. KYLE, a citizen of the United States, and a resident of Arlington, in the county of Washington and State of Nebraska, have invented certain useful Improvements in Rotary Plows; and I do hereby declare that the following is a full, clear, and exact description of the invention, such as will enable others skilled in the art to which it appertains to make and use the same, reference being had to the accompanying drawings, which form a part of this specification.

This invention has relation to a new and novel rotary plow, the object being to provide a plow that shall be simple of construction and readily operated.

Figure 1:
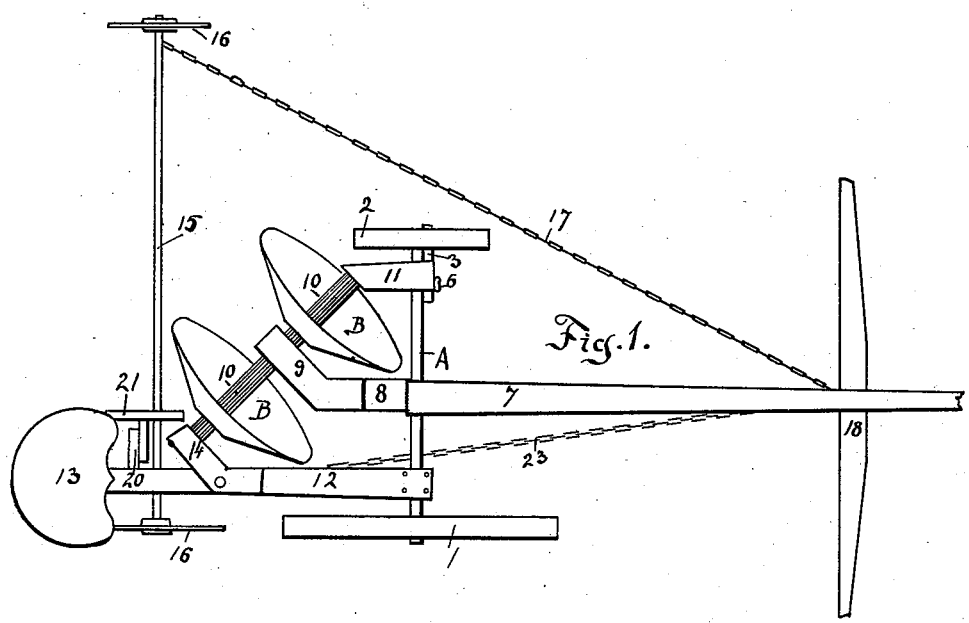
Figure 2:
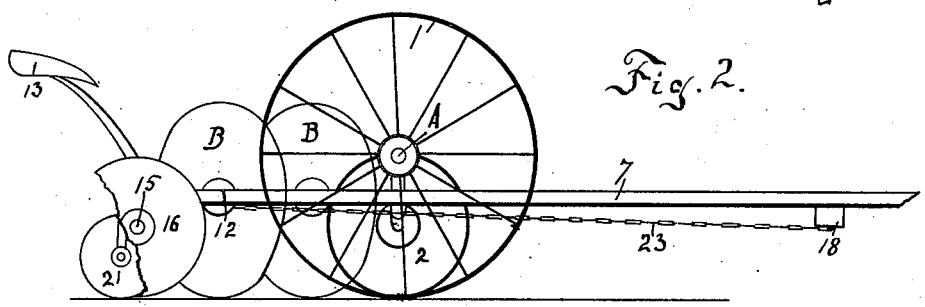

In the accompanying drawings, Figure 1 shows a top view of my improved plow. Fig. 2 is a side elevation thereof with parts broken away, while Fig. 3 shows arrangement of the adjustable wheels.

Figure 3:
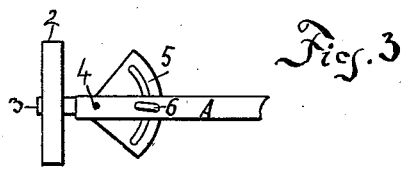

My invention comprises, essentially, a steel main supporting-axle A, which is provided with two supporting-wheels 1 and 2, of different diameters, which are secured to this axle, the wheel marked 1 being larger in diameter than the wheel marked 2, and the small wheel 2 is canted obliquely and is adapted to ride in a furrow and is mounted upon the stub-shaft 3, as shown in Fig. 3. This shaft 3 is pivoted, by means of the bolt 4, to the main axle A and is provided with a plate 5, having a radial slot within which is the hand-screw 6, by means of which the stub-shaft 3 may be locked at any suitable angle to the axle A, the screw 6 passing through the plate 5, and so securing the stub-shaft to the main axle A. Centrally I secure a tongue 7 to this axle A by means of suitable bolts, and the rear of this tongue is provided with a bearing 8 at an angle thereto, provided with a journal-bearing 9, through which the plow or disk shaft 10 is made to pass. Upon each side of this central bearing 8 are the additional bearings 11 and 12, the bearing 11 being a stub-brace, preferably of metal, which is fixed to the axle A and is adapted to receive one of the ends of the disk shaft 10, which is held at an angle to the axle A, as shown in Fig. 1. The bearing 12 is extended so as to give a purchase at its rear end to the seat 13, while near the center it gives a bearing to the remaining end of the disk shaft 10. Working within the bearing 12 is an extending axle 15, which is provided with the two cutting-disks 16 16, one being secured at each end of this axle 15. At one end of this axle is a guide-chain 17, which is secured below to the singletree 18. This axle works to the rear and helps in supporting the frame of the plow. Secured to the bearing 12 by means of the bracket 20 is the additional wheel 21, which is also provided with a plate precisely similar to that described for the wheel 3, so that this wheel can also be given angular adjustment. Secured to the bearing 12 and below the same is the guy-chain 23, which is also run below and secured to the singletree 18. The seat 13 is secured by means of a suitable arm to the bearing 12. To the shaft 10 are secured two concavo-convex rotary disks B B, which are securely fixed to this disk shaft 10 and are permitted to revolve within the bearings 8, 11, and 12.

The operation of my device would be as follows: The device would be drawn by means of the singletree 18, so as to directly draw the plow by means of the bearing 12 and the shaft 15. The rotary plows B B, which are canted at an angle to the machine, readily work themselves into the ground by virtue of the weight of the machine and that of the operator, who is supposed to be mounted upon the plow. The weight of the machine also drives the cutting-disks 16 16 into the soil, so that the plow is prevented from swaying to one side or the other. The wheels 3 and 21 are further obliquely canted, so that they work within the furrows cast by the plow. The wheel 3 is so positioned that it runs within the furrow of one of the disk plows, while the wheel 21 works within the furrow of the other. By means of these wheels of course the machine is maintained within a set line. The cutting-disks 16 16 further slice the earth and so aid the rotary plows in working the soil. The device is extremely simple in construction, and the parts are readily accessible and adjustable.

Now, having thus described my said invention, what I claim as new, and desire to secure by United States Letters Patent, is—

1. The combination with a main supporting-axle provided with two wheels of different diameters, one of said wheels being provided with a stub-axle adjustably secured to the main axle, of a tongue secured to said axle and adapted to offer a bearing in the rear, of a stub-bearing secured to said axle upon one side and an extended bearing secured to said main axle, upon the other side an auxiliary axle secured to said extended bearing, and a shaft working within said bearings provided with one or more concavo-convex rotary plows, all arranged substantially as and for the purpose set forth.

2. In a rotary plow, the combination with the axle, A, the wheels, 1 and 2, of different diameters, said wheel, 2, being adjustably secured to said main axle, A, the central angular bearing, 8, and the extended bearings, 11 and 12, being secured at its end to the auxiliary axle, 15, provided with the cutting-disks, 16, 16, and the adjustable wheel, 21, secured to said extending bearing-bar, 12; said bearings, 8, 11 and 12, being adapted to give support to the plow-shaft, 10, provided with the concavo-convex disks, B, B, in combination with the tongue, 7, and the chains, 17 and 23, all arranged to operate substantially as and for the purpose set forth.

3. The combination with a main supporting-axle mounted upon adjustable and fixed wheels of different diameters, of extended bearings secured to said main axle and giving support to a disk shaft provided with one or more rotary plows, and of an auxiliary axle provided with cutting-disks secured to said main axle, all arranged to operate substantially as and for the purpose set forth.

In testimony whereof I affix my signature in presence of two witnesses.

BARTON W. KYLE.

Witnesses:
W. R. DOWNS,
J. C. BADGER.